(12) United States Patent
Miller et al.

(10) Patent No.: US 8,311,086 B2
(45) Date of Patent: Nov. 13, 2012

(54) CATV DIGITAL RECEIVER INTERMODULATION SUSCEPTIBILITY TESTER

(75) Inventors: Walter Miller, Greenwood, IN (US);
Pingnan Shi, Greenwood, IN (US);
Reena Ramname, Fishers, IN (US);
Gregory W. Massey, Greenfield, IN (US)

(73) Assignee: Acterna LLC, Germantown, MD (US)

( * ) Notice: Subject to any disclaimer, the term of this patent is extended or adjusted under 35 U.S.C. 154(b) by 952 days.

(21) Appl. No.: 12/241,365

(22) Filed: Sep. 30, 2008

(65) Prior Publication Data
US 2009/0086028 A1     Apr. 2, 2009

Related U.S. Application Data

(60) Provisional application No. 60/976,823, filed on Oct. 2, 2007.

(51) Int. Cl.
*H04B 3/46* (2006.01)
(52) U.S. Cl. .......................... 375/224; 375/228; 375/229
(58) Field of Classification Search ................... 375/224
See application file for complete search history.

(56) References Cited

U.S. PATENT DOCUMENTS

| | | | |
|---|---|---|---|
| 5,001,776 A | 3/1991 | Clark | 455/226 |
| 5,422,682 A * | 6/1995 | Nakade et al. | 348/732 |
| 6,009,129 A | 12/1999 | Kenney et al. | 375/346 |
| 6,646,449 B2 * | 11/2003 | Seppinen et al. | 324/624 |
| 2003/0122534 A1 * | 7/2003 | Seppinen et al. | 324/76.51 |
| 2004/0235445 A1 * | 11/2004 | Gomez | 455/307 |
| 2006/0222115 A1 * | 10/2006 | Dornbusch et al. | 375/345 |
| 2007/0015474 A1 * | 1/2007 | Heinikoski et al. | 455/126 |
| 2008/0214138 A1 * | 9/2008 | Gomez | 455/307 |
| 2010/0014572 A1 * | 1/2010 | Nowotarski et al. | 375/228 |

* cited by examiner

*Primary Examiner* — David Ometz
*Assistant Examiner* — Santiago Garcia
(74) *Attorney, Agent, or Firm* — Matthew A. Pequignot; Pequignot + Myers LLC

(57) ABSTRACT

A method and apparatus are provided for testing susceptibility of a receiver to intermodulation distortion of a digital channel, the method including selecting a first digital channel from channels in a composite signal, determining a first power measurement from the first digital channel, determining a total power measurement from other channels in the composite signal, and determining susceptibility of the first digital channel to intermodulation distortion by comparing the first power measurement and the total power measurement with intermodulation distortion characteristics of the receiver.

20 Claims, 5 Drawing Sheets

CATV DIGITAL RECEIVER INTERMODULATION SUSCEPTIBILITY TESTER

CROSS-REFERENCE TO RELATED APPLICATION

This application claims priority under 35 U.S.C. §119 to U.S. Provisional Patent Application No. 60/976,823 filed on Oct. 2, 2007, entitled "CATV Digital Receiver Intermodulation Susceptibility Tester", by Miller et al., which is incorporated herein by reference for all purposes.

BACKGROUND OF THE INVENTION

The present invention relates to cable television (CATV) receivers. More particularly, the present disclosure relates to a method and apparatus for measuring the susceptibility to intermodulation distortion of digital CATV receivers.

Intermodulation distortion generally occurs in a digital receiver, such as a cable modem or set-top box, when the total power of all signals input to the receiver is too high relative to the power of the digital signal desired to be demodulated. However, if the relative power level of the desired digital channel could be increased, the receiver might be able to attenuate all incoming signals and substantially prevent the intermodulation distortion from occurring.

When intermodulation distortion occurs, the receiver experiences decode errors that are not caused by impairments within the digital channel. Existing test instruments can measure the bit error rate caused by impairments within a digital channel, but not those caused by intermodulation distortions generated within the receiver, such as a cable modem, set-top box, or other consumer-grade receiver. Test instrument receivers may be capable of rejecting relatively high signal amplitude levels that fall outside of the particular frequency range of the digital channel being measured. On the other hand, the receivers used in consumer-grade equipment are typically not so capable. Thus, the test instruments are unable to measure or accurately estimate bit errors caused by intermodulation distortion at a consumer-grade receiver. Therefore, such test instruments will generally fail to report problems that cause impairments in consumer-grade equipment.

Unfortunately, the difference in amplitude levels between the lowest and highest frequencies carried on a cable is typically not a constant value. A coaxial cable, for example, attenuates higher frequencies more than lower frequencies. This effect is known as tilt. In order to compensate for attenuation, amplifiers are used to boost the overall signal power. Equalizers may be used in conjunction with the amplifiers so that the net signal boost is greater for higher frequencies, thereby reducing the tilt.

SUMMARY OF THE INVENTION

These and other issues are addressed by a method and apparatus for testing susceptibility of a receiver to intermodulation distortion of a digital channel. Exemplary embodiments are provided.

An exemplary method of the present disclosure includes selecting a first digital channel from a plurality of channels in a composite signal, determining a first power measurement from said first digital channel, determining a total power measurement from at least one other channel in said composite signal, and determining susceptibility of said first digital channel to intermodulation distortion by comparing said first power measurement and said total power measurement with intermodulation distortion characteristics of said receiver.

Another exemplary method is provided wherein said receiver comprises a cable television (CATV) receiver. Another exemplary method is provided wherein said first digital channel and said at least one other channel comprise video channels. Yet another exemplary method is provided wherein at least one of said first power measurement or said total power measurement is determined at an input of said receiver.

Another exemplary method is provided, further comprising determining a level-versus-frequency tilt of said composite signal. Another exemplary method is provided wherein said level-versus-frequency tilt of said composite signal is determined at an input of said receiver. Yet another exemplary method is provided, further comprising compensating for a differing signal tilt when performing at least one of said first or total power measurements at a location different from a location of said receiver by utilizing said level-versus-frequency tilt.

Another exemplary method is provided wherein said at least one other channel in said composite signal comprises at least one analog channel. Yet another exemplary method is provided wherein said at least one other channel in said composite signal comprises a plurality of analog channels.

Another exemplary method is provided, further comprising computing a relative power ratio between said first power measurement and said total power measurement. Yet another exemplary method is provided, further comprising using said relative power ratio to predict the likelihood that other devices receiving said first digital channel will be impaired by internal intermodulation distortions.

Another exemplary method is provided, further comprising generating a tilt line for a plurality of channels in said composite signal to use as a reference power. Yet another exemplary method is provided, further comprising outputting a susceptibility result for said first digital channel in accordance with said reference power so that a same test device will give a same susceptibility result at different points in a network having different tilts.

An exemplary intermodulation test device is provided for testing susceptibility of a receiver to intermodulation distortion of a digital channel, the device comprising a tuner for selecting a first digital channel from a plurality of channels in a composite signal, a detector in signal communication with the tuner for determining a first power measurement from said first digital channel and determining a total power measurement from at least one other channel in said composite signal, and a controller in signal communication with the detector for determining susceptibility of said first digital channel to intermodulation distortion by comparing said first power measurement and said total power measurement with intermodulation distortion characteristics of said receiver.

Another exemplary device is provided, further comprising a display in signal communication with the controller for outputting a result indicative of the determined susceptibility of said first digital channel to intermodulation distortion. Yet another exemplary method is provided, the controller comprising a channel selection unit, a channel plan unit, a digital channel measurement unit in signal communication with the channel selection unit and the channel plan unit, another channel measurement unit in signal communication with the channel plan unit, an evaluation unit in signal communication with the digital channel measurement unit, and a results unit in signal communication with the evaluation unit.

Another exemplary device is provided wherein the evaluation unit is further in signal communication with the other channel measurement unit. Another exemplary device is provided, further comprising a configurable limit unit in signal communication with the evaluation unit. Yet another exemplary device is provided, further comprising a device specification database in signal communication with the evaluation unit.

Another exemplary device is provided, further comprising a tilt calculator in signal communication with the other channel measurement unit, a tilt reference unit in signal communication with the tilt calculator, and a tilt compensator in signal communication with each of the digital channel measurement unit and the other channel measurement unit, wherein the evaluation unit is in signal communication with both the digital channel measurement unit and the tilt compensator.

The present disclosure will be further understood from the following description of exemplary embodiments, which is to be read in connection with the accompanying drawings.

BRIEF DESCRIPTION OF THE DRAWINGS

The present disclosure will be described in greater detail with reference to the accompanying drawings, which represent exemplary embodiments thereof, in which.

DETAILED DESCRIPTION OF PREFERRED EMBODIMENTS

The present disclosure provides a method and apparatus for testing the likelihood that a receiver will be impaired by internal intermodulation (IM) distortions as a result of the power distribution across the channels within the received signal. Preferred embodiments measure the signals present on a cable rather than those present within a digital receiver. The IM distortion itself is generated within a digital receiver when adverse signal conditions are present. Such adverse signal conditions may include too much power relative to the desired signal at frequencies above and/or below the frequency band containing the desired signal, for example.

An exemplary embodiment measures the susceptibilities of cable television (CATV) digital receivers to IM distortion. Exemplary embodiments operate by analyzing signal levels to be input to the receivers, either at the receivers or at known or estimated cable lengths upstream from the receivers. Embodiments may compare the highest analog channel amplitude to the lowest digital channel amplitude, compensate for the inherent tilt of typical coaxial cables, evaluate a user-selected channel, or reference tilt and power.

A system embodiment measures and reports the signal conditions on a CATV network that can cause intermodulation distortions to occur in consumer-grade digital receivers, enabling technicians to identify and correct the problem. The presently disclosed testing device is capable of measuring the tilt at the point of measurement and compensating for the tilt when it computes the susceptibility to intermodulation distortion. The device may be used to evaluate a single digital channel or scan all digital channels and measure the one with the greatest susceptibility to intermodulation distortion, for example.

Figure 1:
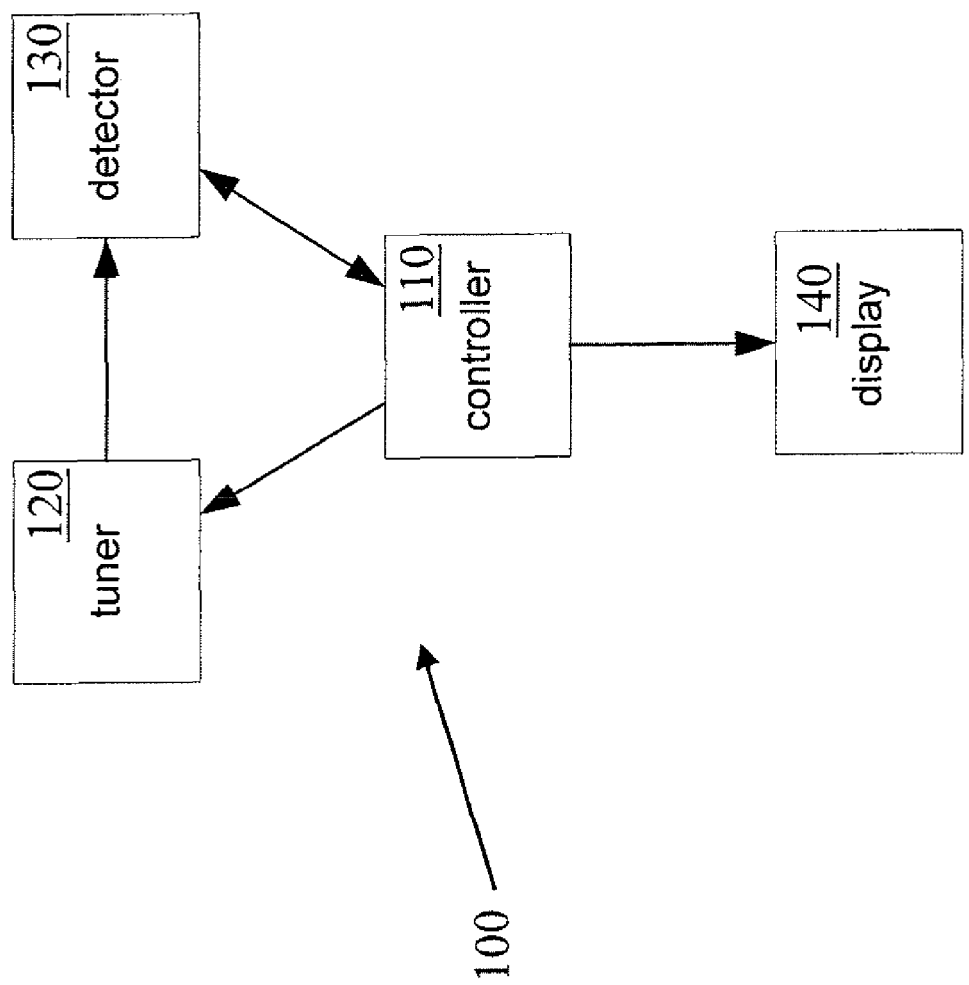
FIG. 1 is a schematic diagram of an intermodulation testing device in accordance with an exemplary embodiment of the present disclosure.

As shown in FIG. 1, an intermodulation testing device is indicated generally by the reference numeral 100. The tester 100 includes a controller 110, a radio frequency (RF) tuner 120 connected to the controller, a detector 130 connected to both the controller and the tuner, and a display 140 connected to the controller. The RF tuner 120 is capable of tuning to any channel being broadcast on the CATV network. The detector 130 may include one or more appropriate detectors for measuring the power of analog and/or digital TV channels. The controller 110 may include non-volatile memory for storing both an operating program and configuration data. The display 140 may be as simple as an indicator light or as elaborate as a touch screen for configuring the device, selecting channels, and reporting measurement progress and results.

Figure 2:
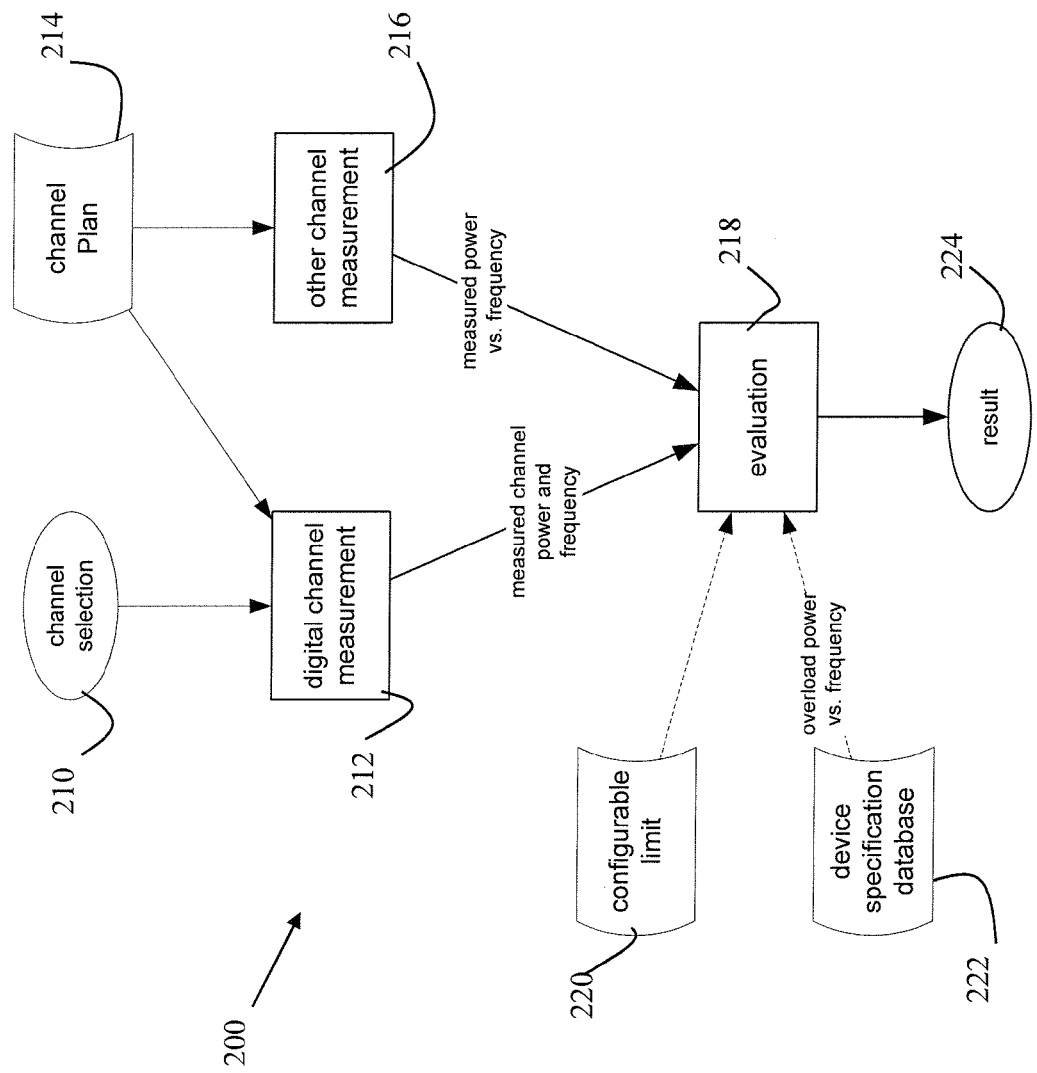
FIG. 2 is a functional diagram of a controller for the testing device of FIG. 1 in accordance with an exemplary embodiment of the present disclosure.

Turning to FIG. 2, a method executable by the controller 110 of FIG. 1 is indicated generally by the reference numeral 200. The method 200 includes a channel selection block 210, which passes control to a digital channel measurement block 212. The digital channel measurement block receives a channel plan 214, which contains a description of the channels being transmitted on the cable, including frequency and modulation type. The digital channel measurement block 212 measures the power of a selected digital channel. For example, one method of measuring the digital channel power is known in the art as Digicheck. Another less accurate method is to measure the power at the center frequency and add a bandwidth compensation factor based on the ratio of digital channel bandwidth to measurement bandwidth. The digital channel measurement block 212 may perform the power measurement periodically in order to update the display with current results.

Another channel measurement block 216 also receives the channel plan 214, and measures the power of all or a subset of the channels being transmitted. The other channel measurement block 216 may measure all the channels, or just those that could substantially contribute to intermodulation distortion. Such other measured channels could be the video carriers of the analog TV channels, for example, since they normally have the highest power. The other channel measurement block 216 may perform only one measurement for each channel, measure all of them periodically, or select a small number with the highest power and measure them periodically in order to update the display with current results.

An evaluation block 218 is connected to both the digital channel measurement block 212, for receiving measured channel power and frequency, and to the other channel measurement block 216, for receiving measured power versus frequency. The evaluation block 218 compares the power of the digital channel being tested to the power of the other channels and determines whether a device receiving the digital channel is susceptible to intermodulation distortions.

Different types of evaluations are possible in the evaluation block 218. In a first example, the evaluation block 218 may subtract the digital channel power from the highest of the other channels' measured powers. If this result is over a threshold value or configurable limit 220, the channel is indicated as susceptible. The degree of susceptibility may be indicated by the amount that the difference exceeds the threshold. In a second example, the evaluation block 218 may sum the measured powers of the other channels to get a total integrated power, and then subtract the digital channel power from this sum.

As in the first example, the evaluation block compares the value to a threshold to evaluate the susceptibility to intermodulation distortions. In a third example, the evaluation block 218 may consider the capability of a tuner to reject off-frequency signals as a function of frequency or difference in frequency between the digital channel being received and the frequency of the other signal. Here, the evaluation block 218 sums the amount by which the power of any channel other than the digital channel being evaluated exceeds the device's rejection capability. The sum of these is defined herein as the "total overload power". As in the first example, the evaluation block compares this value to a threshold to evaluate the susceptibility to intermodulation distortions.

In an alternate embodiment, the method may measure the powers of only those channels for which sums and differences of harmonic frequencies of two or three channels falls within the frequency band of the first digital channel. Here, composite second order (CSO) distortion is the sum or difference of two signals or their harmonics, and composite triple beat (CTB) distortion is the sum and/or difference of three signals or their harmonics.

The controller 110 or tester 100 of FIG. 1 may further evaluate the susceptibility of a single digital channel selected by the user. The tester may also scan all digital channels and report the susceptibility of each. The tester may report which channel is most susceptible and the particular susceptibility of only that channel. The tester may display or otherwise output a susceptibility report or result 224, which may be a pass/fail indicator and/or the degree of susceptibility, displayed either numerically or graphically. The tester may evaluate susceptibility compared to a reference specification from a device specification database 222, which database may provide overload power versus frequency. The specification may be configurable. The tester 100 may further contain a database of the susceptibility characteristics of various receiver devices. A user of the tester could select a device from the database, and the tester would report its susceptibility.

The susceptibility result 224 of this exemplary embodiment may be valid for devices connected at or near the same location as the tester. The signal may have a different tilt at other locations.

Figure 3:
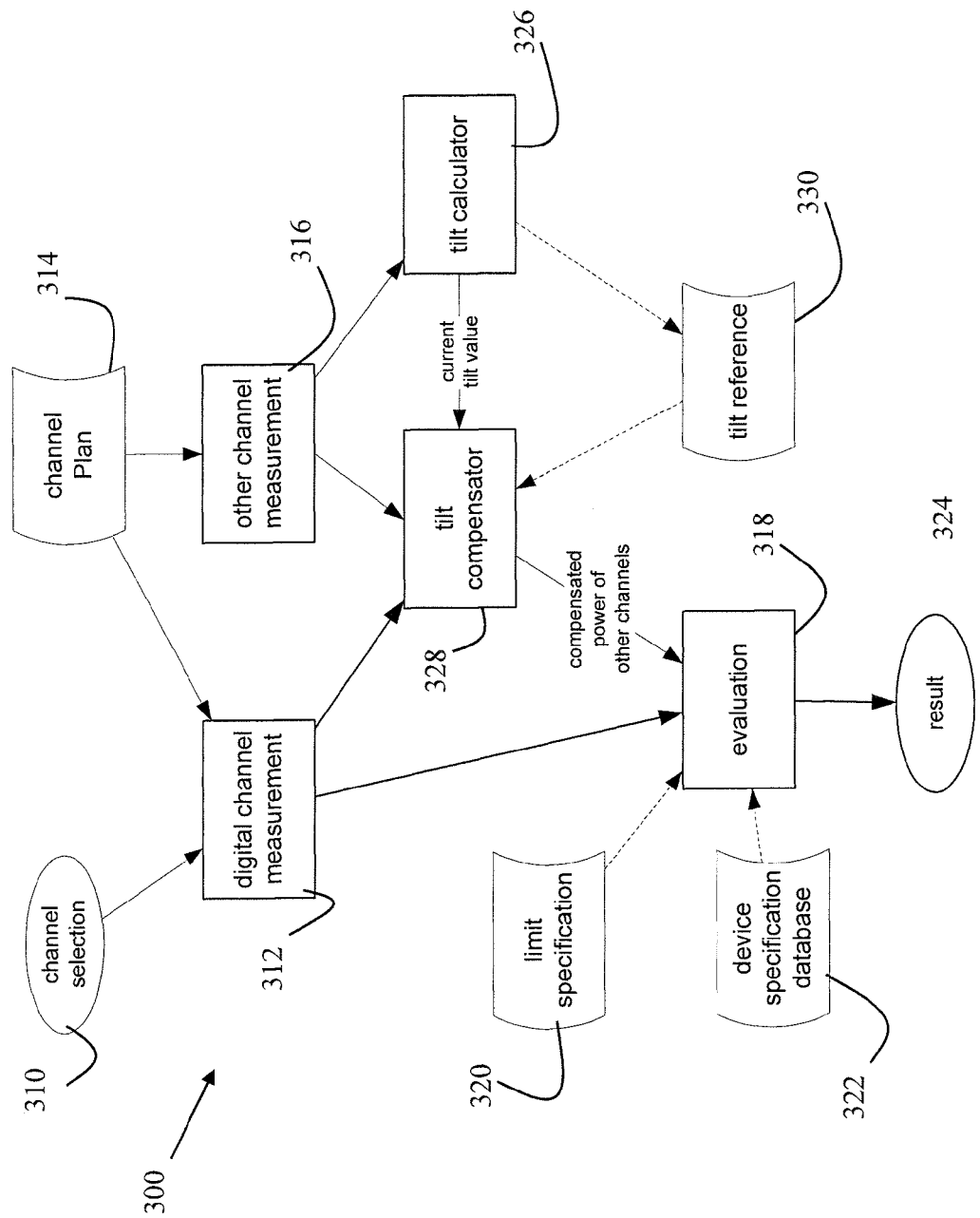
FIG. 3 is a functional diagram of a controller with tilt compensation for the testing device of FIG. 1 in accordance with an exemplary embodiment of the present disclosure.

Turning now to FIG. 3, another method executable by the controller 110 of FIG. 1 is indicated generally by the reference 300. The method 300 is similar to the method 200; so duplicate description shall be omitted. The method 300 includes extra functional blocks to perform tilt compensation, such as to measure susceptibility at other locations distant from the location of the tester 100.

The method 300 includes a channel selection block 310, which passes control to a digital channel measurement block 312. The digital channel measurement block receives a channel plan 314. The digital channel measurement block 312 measures the power of a selected digital channel. Another channel measurement block 316 also receives the channel plan 314, and measures the power of at least some of the other channels being transmitted.

A tilt calculator 326 is connected to the other channel measurement block 316, and provides a tilt reference 330. A tilt compensator 328 is connected to each of the digital channel measurement block 312, the other channel measurement block 316, and the tilt calculator 326 for receiving a current tilt value.

An evaluation block 318 is connected to both the digital channel measurement block 312 and the tilt compensator 328 for receiving compensated power of other channels. The evaluation block 318 may receive a limit specification or threshold 320 and/or information from a device specification database 322. The evaluation block 318 compares the power and/or compensated power of the digital channel being tested to the compensated powers of the other channels, determines whether a device receiving the digital channel is susceptible to intermodulation distortions, and outputs a corresponding result 324.

Figure 4:
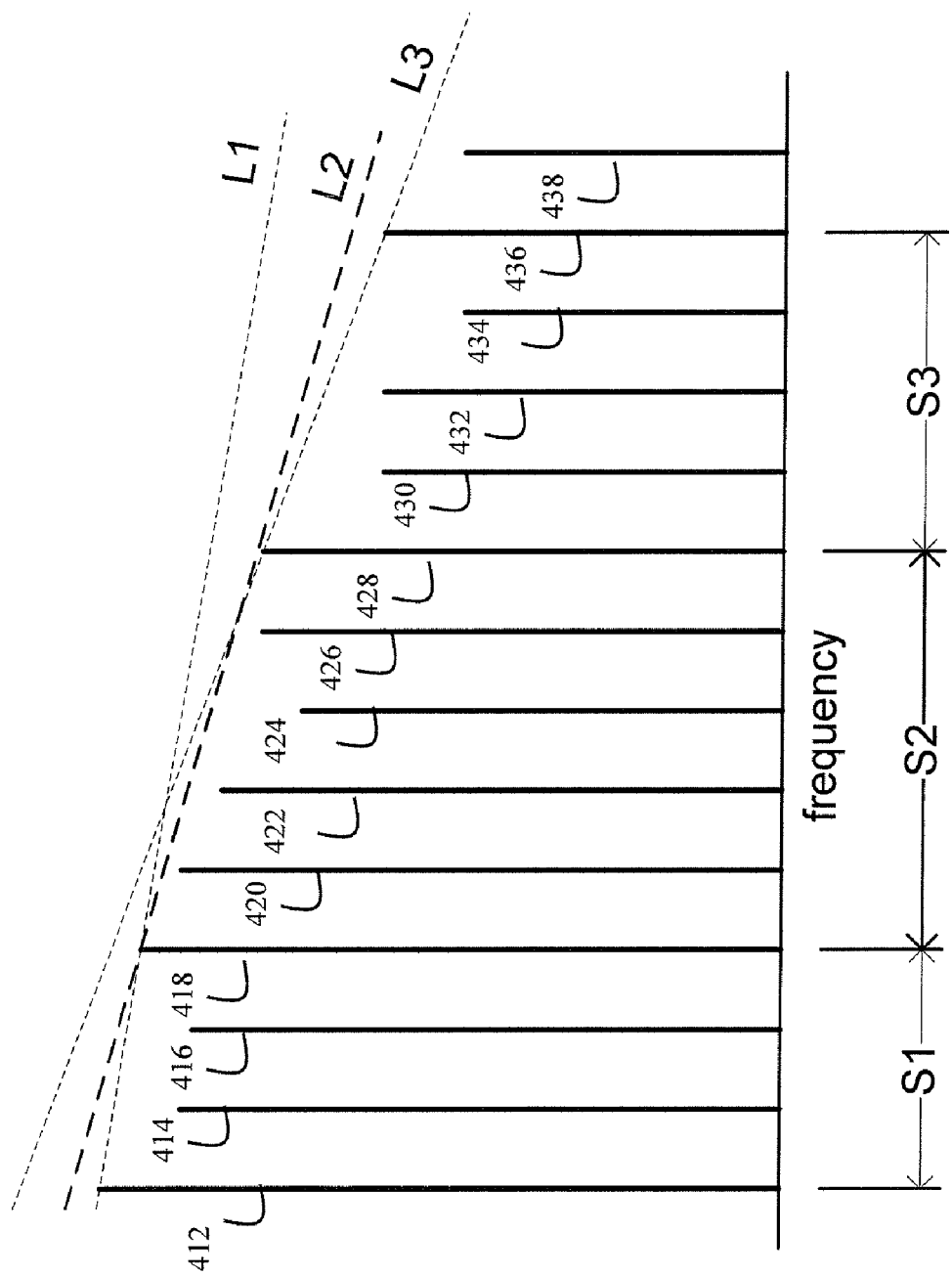
FIG. 4 is a graphical diagram of measured powers of analog channels in accordance with an exemplary embodiment of the present disclosure.

As shown in FIG. 4, a plot of measured powers of analog TV channels is generally indicated by the reference numeral 400. The plot 400 includes measured analog signal powers 412, 414, 416, 418, 420, 422, 424, 426, 428, 430, 432, 434, 436 and 438, each at a different carrier frequency. Here, a first frequency span S1 includes the measured powers 412, 414, 416 and 418. A second frequency span S2 includes the measured powers 418, 420, 422, 424, 426 and 428; and a third frequency span S3 includes the measured powers 428, 430, 432, 434 and 436. The tilt calculator 326 of FIG. 3 may use these measured powers to compute a slope of a tilt line. A tilt line is a straight line intersecting the measured levels of two of the highest channels such that all other channels have less than or equal to the power at that frequency on the tilt line.

In the exemplary plot 400, tilt lines L1, L2 and L3 are present. If two or more possible tilt lines are found, as here, the one covering the widest frequency span is used. From the three possible tilt lines, L2 is selected over L1 and L3 because it has the widest frequency span S2. If two or more tilt lines are found having equal frequency spans, the one with less tilt is used. The tilt calculator 326 outputs the slope of the tilt line, but need not calculate nor output the y-intercept.

A user may assume that the signal has no tilt at the point that subscriber equipment is connected. Alternatively, the user may use the device to measure the actual tilt at the subscriber location. If the actual tilt is used, the device may store it as a reference tilt. If known, the reference tilt value may also be entered into the device without performing a tilt measurement.

When tilt compensation is used, the device first measures the tilt. It uses the difference between the current tilt and the reference tilt to adjust the measured powers of all channels. The amount of adjustment is given by the equation:

$$\text{tiltComp(freq)} = (\text{refTilt} - \text{currentTilt}) * (\text{freq} - \text{digFreq}) \quad \text{(Equation 1)}$$

In Equation 1, currentTilt is the measured tilt at the current location, refTilt is the tilt at the location of the subscriber's receiver, freq is the frequency of the channel being adjusted, and digFreq is the frequency of the digital channel for which susceptibility is being evaluated. The adjustment is added to the measured value before passing it on to the evaluation block 318.

Figure 5:
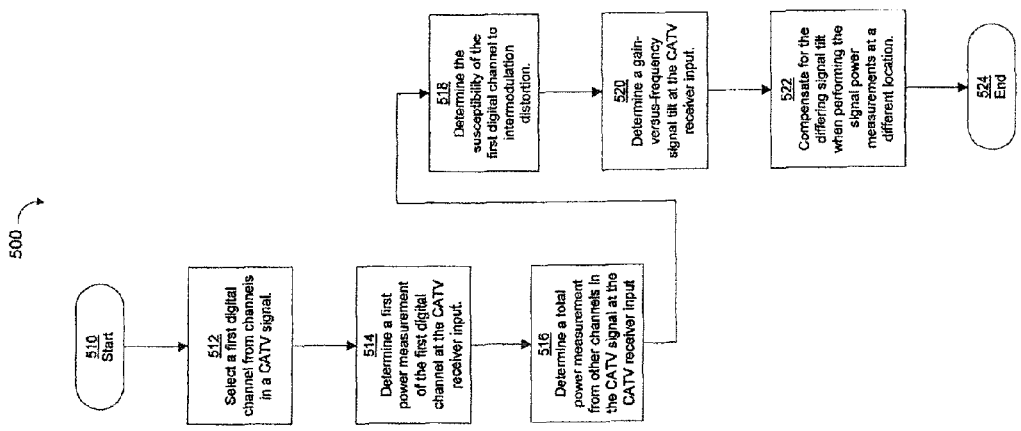
FIG. 5 is a flow diagram for a method of intermodulation susceptibility testing device in accordance with an exemplary embodiment of the present disclosure.

Turning to FIG. 5, a method for assessing susceptibility of a CATV receiver to intermodulation distortion is indicated generally by the reference numeral 500. The method 500 includes a start block 510, which passes control to a function block 512. The function block 512 selects a first digital channel from a plurality of channels in a CATV signal, and passes control to a function block 514. The function block 514 determines a first power measurement of the first digital channel at the CATV receiver input, and passes control to a function block 516. The function block 516 determines a total power measurement from one or more of the other channels in the CATV signal at the CATV receiver input, and passes control to a function block 518. The function block 518, in turn, determines the susceptibility of the first digital channel to intermodulation distortion by comparing the first and total power measurements with known intermodulation distortion characteristics of the CATV receiver.

Optionally, the method 500 may further include a function block 520, which receives control from the function block 518 and determines a level-versus-frequency signal tilt at the CATV receiver input. In addition, the method 500 may further include a function block 522, which receives control from the function block 520 and uses the level-versus-frequency signal tilt measured at the CATV receiver input to compensate for the differing signal tilt when performing the signal power measurements at a location in the network other than at the original CATV receiver input. The function block 522 may then pass control to an end block 524.

The above and alternate embodiments provide a method and apparatus for measuring and analyzing the signals present at the input of a CATV digital receiver, and thereby determining its susceptibility to intermodulation (IM) distortion. The IM distortion results when the total power received across all digital and analog signal frequencies exceeds by a critical amount the strength of the selected digital signal being demodulated. Technicians can use this diagnostic tool to measure a single digital channel and/or scan all digital channels, and pursue appropriate corrective action for instances in which susceptibility to IM distortion is indicated. Embodiments may also use a level-versus-frequency signal tilt compensation feature, which enables a tester 100 to evaluate a receiver connected at a different location in the network from that of the tester.

Preferred embodiments of the test device 100 of FIG. 1 may use a relative power ratio between the analog video channels and a digital channel in order to predict the likelihood that other devices receiving that digital channel will be impaired by internal intermodulations. Such other devices may be of different types, each having unique specifications stored in a device specification database 322, for example. A tester 100 may further generate a tilt line for use as the reference power so that the same device will give the same results at different points in the network that have different tilts.

Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

What is claimed is:

1. A method for testing susceptibility of a receiver to intermodulation distortion of a digital channel, the method comprising:
   selecting a first digital channel from a plurality of channels in a composite signal;
   determining a first power measurement from said first digital channel;
   determining a total power measurement, separate from said first power measurement, from at least one other channel, different from said first digital channel, in said composite signal; and
   determining susceptibility of said first digital channel to intermodulation distortion by comparing said first power measurement and said total power measurement, which is separate from said first power measurement, with intermodulation distortion characteristics of said receiver.

2. The method of claim 1, wherein said receiver comprises a cable television (CATV) receiver.

3. The method of claim 1, wherein said at least one other channel comprises at least one video channel.

4. The method of claim 1, wherein at least one of said first power measurement or said total power measurement is determined at an input of said receiver.

5. The method of claim 1, further comprising determining a level-versus-frequency tilt of said composite signal.

6. The method of claim 5, wherein said level-versus-frequency tilt of said composite signal is determined at an input of said receiver.

7. The method of claim 5, further comprising compensating for a differing signal tilt when performing at least one of said first or total power measurements at a location different from a location of said receiver by utilizing said level-versus-frequency tilt.

8. The method of claim 1, wherein said at least one other channel in said composite signal comprises at least one analog channel.

9. The method of claim 1, wherein said at least one other channel in said composite signal comprises a plurality of analog channels.

10. The method of claim 1, further comprising computing a relative power ratio between said first power measurement and said total power measurement.

11. The method of claim 10, further comprising using said relative power ratio to predict the likelihood that other devices receiving said first digital channel would be impaired by internal intermodulation distortions.

12. The method of claim 1, further comprising generating a tilt line for a plurality of channels in said composite signal to use as a reference power.

13. The method of claim 12, further comprising outputting a susceptibility result for said first digital channel in accordance with said reference power so that a same test device will give a same susceptibility result at different points in a network having different tilts.

14. An intermodulation test device for testing susceptibility of a receiver to intermodulation distortion of a digital channel, the device comprising:
   a tuner for selecting a first digital channel from a plurality of channels in a composite signal;
   a detector in signal communication with the tuner for determining a first power measurement from said first digital channel, and for determining a total power measurement, separate from said first power measurement, from at least one other channel, different from said first digital channel, in said composite signal; and
   a controller in signal communication with the detector for determining susceptibility of said first digital channel to intermodulation distortion by comparing said first power measurement and said total power measurement, which is separate from said first power measurement, with intermodulation distortion characteristics of said receiver.

15. The device of claim 14, further comprising a display in signal communication with the controller for outputting a result indicative of the determined susceptibility of said first digital channel to intermodulation distortion.

16. The device of claim 14, wherein the controller comprises:
   a channel selection unit;
   a channel plan unit;
   a digital channel measurement unit in signal communication with the channel selection unit and the channel plan unit;

another channel measurement unit in signal communication with the channel plan unit;
an evaluation unit in signal communication with the digital channel measurement unit; and
a results unit in signal communication with the evaluation unit.

17. The device of claim 16, wherein the evaluation unit is further in signal communication with the other channel measurement unit.

18. The device of claim 16, further comprising a configurable limit unit in signal communication with the evaluation unit.

19. The device of claim 16, further comprising a device specification database in signal communication with the evaluation unit.

20. The device of claim 16, further comprising:
a tilt calculator in signal communication with the other channel measurement unit;
a tilt reference unit in signal communication with the tilt calculator; and
a tilt compensator in signal communication with each of the digital channel measurement unit and the other channel measurement unit,
wherein the evaluation unit is in signal communication with both the digital channel measurement unit and the tilt compensator.

* * * * *